United States Patent
Kang et al.

(10) Patent No.: US 9,902,868 B2
(45) Date of Patent: *Feb. 27, 2018

(54) HARD COATING FILM

(71) Applicant: LG CHEM, LTD., Seoul (KR)

(72) Inventors: Joon-Koo Kang, Daejeon (KR);
Yeong-Rae Chang, Daejeon (KR);
Sung-Don Hong, Daejeon (KR);
Soon-Hwa Jung, Daejeon (KR);
Eun-Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 271 days.

This patent is subject to a terminal disclaimer.

(21) Appl. No.: 14/423,286

(22) PCT Filed: Jul. 29, 2013

(86) PCT No.: PCT/KR2013/006778
§ 371 (c)(1),
(2) Date: Feb. 23, 2015

(87) PCT Pub. No.: WO2014/030849
PCT Pub. Date: Feb. 27, 2014

(65) Prior Publication Data
US 2015/0252212 A1    Sep. 10, 2015

(30) Foreign Application Priority Data

Aug. 23, 2012  (KR) .................. 10-2012-0092532
Jul. 26, 2013  (KR) .................. 10-2013-0089101

(51) Int. Cl.
| | |
|---|---|
| C09D 135/02 | (2006.01) |
| C08L 51/08 | (2006.01) |
| C09D 183/06 | (2006.01) |
| C08J 7/04 | (2006.01) |
| C09D 4/06 | (2006.01) |
| C08K 3/36 | (2006.01) |

(52) U.S. Cl.
CPC ............ *C09D 135/02* (2013.01); *C08J 7/042* (2013.01); *C08J 7/047* (2013.01); *C08L 51/08* (2013.01); *C09D 4/06* (2013.01); *C09D 183/06* (2013.01); C08J 2367/02 (2013.01); C08J 2433/06 (2013.01); C08K 3/36 (2013.01); C08K 2201/011 (2013.01); *Y10T 428/24917* (2015.01); *Y10T 428/24942* (2015.01); *Y10T 428/24967* (2015.01)

(58) Field of Classification Search
None
See application file for complete search history.

(56) References Cited

U.S. PATENT DOCUMENTS

| | | |
|---|---|---|
| 5,146,531 A | 9/1992 | Shustack |
| 6,489,015 B1 | 12/2002 | Tsuchiya et al. |
| 2004/0081831 A1 | 4/2004 | Shoshi et al. |
| 2005/0136273 A1 | 6/2005 | Hashimoto et al. |
| 2007/0134463 A1 | 6/2007 | Sinha et al. |
| 2007/0178297 A1 | 8/2007 | Takada et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0311351 A1 | 12/2008 | Hsu et al. |
| 2009/0169896 A1 | 7/2009 | Sohn et al. |
| 2009/0202819 A1 | 8/2009 | Asahi et al. |
| 2009/0214871 A1 | 8/2009 | Fukuda et al. |
| 2010/0055377 A1 | 3/2010 | Esaki et al. |
| 2010/0084037 A1 | 4/2010 | Ericsson et al. |
| 2011/0050623 A1* | 3/2011 | Lee .................. G06F 3/041 345/174 |
| 2011/0077334 A1 | 3/2011 | Ol et al. |
| 2011/0124823 A1 | 5/2011 | Hayashi et al. |
| 2012/0019766 A1 | 1/2012 | Oki et al. |

FOREIGN PATENT DOCUMENTS

| | | |
|---|---|---|
| CN | 1286640 C | 11/2004 |
| CN | 102257087 A | 11/2011 |
| EP | 2397527 A1 | 12/2011 |
| EP | 2 840 107 A1 | 2/2015 |
| EP | 2 840 109 A1 | 2/2015 |
| EP | 2 840 110 A1 | 2/2015 |
| EP | 2 842 989 A1 | 3/2015 |
| EP | 2 843 008 A1 | 3/2015 |
| EP | 2857440 A1 | 4/2015 |
| JP | 2000015734 A | 1/2000 |
| JP | 2000-071392 A | 3/2000 |

(Continued)

OTHER PUBLICATIONS

JP 2000-214791, Mitsuru et al., Machine Translation provided by EPO, accessed Nov. 17, 2015.*

(Continued)

*Primary Examiner* — Humera N Sheikh
*Assistant Examiner* — Xiaobei Wang
(74) *Attorney, Agent, or Firm* — Rothwell, Figg, Ernst & Manbeck, P.C.

(57) ABSTRACT

The present invention relates to a hard coating film, and, more particularly, to a hard coating film having hardness and excellent physical properties. According to the present invention, the hard coating film has high physical properties including hardness, scratch resistance, transparency, durability, light resistance, and light transmittance.

Thus, the hard coating film can find useful applications in various fields thanks to its excellent physical properties.

20 Claims, No Drawings

(56) References Cited

FOREIGN PATENT DOCUMENTS

| | | |
|---|---|---|
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-288787 A | 10/2005 |
| JP | 2006-231845 A | 9/2006 |
| JP | 2006-233167 A | 9/2006 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008116596 A | 5/2008 |
| JP | 2008-138165 A | 6/2008 |
| JP | 2008129130 A | 6/2008 |
| JP | 2008-150484 A | 7/2008 |
| JP | 2008197662 A | 8/2008 |
| JP | 2008-310286 A | 12/2008 |
| JP | 2009-204725 A | 9/2009 |
| JP | 2009204727 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-248410 A | 12/2010 |
| JP | 2011-031457 A | 2/2011 |
| JP | 2011-031527 A | 2/2011 |
| JP | 2011022456 A | 2/2011 |
| JP | 2011504828 A | 2/2011 |
| JP | 2011-043606 A | 3/2011 |
| JP | 2011-075705 A | 4/2011 |
| JP | 2011-110902 A | 6/2011 |
| JP | 2011-178910 A | 9/2011 |
| JP | 2011-201087 A | 10/2011 |
| JP | 2011-246548 A | 12/2011 |
| JP | 2012-081742 A | 4/2012 |
| JP | 4911474 B2 | 4/2012 |
| JP | 2012066477 A | 4/2012 |
| JP | 2013-095108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2004 |
| KR | 10-2004-0097189 A | 11/2004 |
| KR | 10-2006-0009194 A | 1/2006 |
| KR | 1020060072072 A | 6/2006 |
| KR | 100730414 B1 | 6/2007 |
| KR | 10-2008-0005839 A | 1/2008 |
| KR | 10-2008-0055698 A | 6/2008 |
| KR | 10-0852562 B1 | 8/2008 |
| KR | 100852561 B1 | 8/2008 |
| KR | 10-2008-0109658 A | 12/2008 |
| KR | 1020090006131 A | 1/2009 |
| KR | 10-0884079 B1 | 2/2009 |
| KR | 10-2009-0044089 A | 5/2009 |
| KR | 1020090045105 A | 5/2009 |
| KR | 1020090047529 A | 5/2009 |
| KR | 10-2009-0063182 A | 6/2009 |
| KR | 1020090061821 A | 6/2009 |
| KR | 10-2009-0073668 A | 7/2009 |
| KR | 10-0905683 B1 | 7/2009 |
| KR | 10-0926220 B1 | 11/2009 |
| KR | 10-2010-0026014 A | 3/2010 |
| KR | 10-2010-0041992 A | 4/2010 |
| KR | 10-2010-0055160 A | 5/2010 |
| KR | 1020100045997 A | 5/2010 |
| KR | 10-2010-0129512 A | 12/2010 |
| KR | 10-2010-0132786 A | 12/2010 |
| KR | 10-2011-0034324 A | 4/2011 |
| KR | 10-2011-0037622 A | 4/2011 |
| KR | 101028463 B1 | 4/2011 |
| KR | 10-2011-0058743 A | 6/2011 |
| KR | 10-2011-0071480 A | 6/2011 |
| KR | 10-2011-0103885 A | 9/2011 |
| KR | 1020110119704 A | 11/2011 |
| KR | 10-2011-0130142 A | 12/2011 |
| KR | 10-2012-0002366 A | 1/2012 |
| KR | 10-1127952 B1 | 3/2012 |
| KR | 101114932 B1 | 3/2012 |
| KR | 10-2012-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 101295325 B1 | 8/2013 |
| TW | 200907401 A | 2/2009 |
| TW | 201041985 A | 12/2010 |
| TW | 201130880 A | 9/2011 |
| TW | 201202403 A | 1/2012 |
| TW | I357922 B | 2/2012 |
| WO | 2006046855 A1 | 5/2006 |
| WO | 2006-088200 A1 | 8/2006 |
| WO | WO 2008-098872 A1 | 8/2008 |
| WO | 2011/105532 A1 | 9/2011 |
| WO | 2012/026475 A1 | 3/2012 |
| WO | 2012/060145 A1 | 5/2012 |

OTHER PUBLICATIONS

JP 2011-201087, Kazuko et al., Machine Translation provided by EPO, accessed Nov. 17, 2015.*
Communication from European Patent Office in corresponding application EP 13797819.3 dated Dec. 17, 2015, 12 pages.
Written Opinion and Search Report issued in related international application No. PCT/KR2013/006778 dated Oct. 17, 2013 along with English translation, 17 pages.
Written Opinion and Search Report issued in related international application No. PCT/KR2013/006773 dated Oct. 22, 2013 along with English translation, 20 pages.
Written Opinion and Search Report issued in related international application No. PCT/KR2013/006775 dated Oct. 25, 2013 along with English translation, 25 pages.
Written Opinion and Search Report issued in related international application No. PCT/KR2013/006780 dated Nov. 27, 2013 along with English translation, 20 pages.
Written Opinion and Search Report issued in related international application No. PCT/KR2013/006781 dated Nov. 27, 2013 along with English translation, 18 pages.
Written Opinion and Search Report issued in related international application No. PCT/KR2013/006782 dated Nov. 27, 2013 along with English translation, 20 pages.
Extended Search Report dated Jan. 29, 2016 of EP Patent Application No. 13830624.6 (9 pages).
Extended Search Report dated Mar. 15, 2016 of EP Patent Application No. 13830681.6 (10 pages).
Extended Search Report dated Apr. 6, 2016 of EP Patent Application No. 13831101.4 (8 pages).
Extended Search Report dated Apr. 6, 2016 of EP Patent Application No. 13831327.5 (8 pages).
Extended Search Report dated Mar. 11, 2016 of EP Patent Application No. 13830272.4 (7 pages).
Extended Search Report dated Mar. 14, 2016 of EP Patent Application No. 13830709.5 (9 pages).
Extended Search Report dated Apr. 4, 2016 of EP Patent Application No. 13830724.4 (11 pages).
Shin-Nakamura Chemical Industry Co., Ltd., [Sep. 20, 2016]—Product List, Photo curable monomers/oligomers: Urethane acrylates with English translation (2 pages).
Third Party Observation dated Oct. 14, 2016 of the corresponding Japanese Patent Application No. 2015-528383 (9 pages).
"Ciba TINUVIN 900 Light Stabilizer", Ciba Specialty Chemicals, 1997, pp. 1-3.

* cited by examiner

HARD COATING FILM

This application is a 35 U.S.C. § 371 National Phase Entry Application from PCT/KR2013/006778, filed on Jul. 29, 2013, and designating the United States, which claims priority under 35 U.S.C. § 119 to Korean Patent Application No. 10-2012-0092532, filed on Aug. 23, 2012, and Korean Patent Application No. 10-2013-0089101, filed on Jul. 26, 2013, which are all hereby incorporated by reference in their entireties into this application.

BACKGROUND OF THE INVENTION

1. Field of the Invention

The present invention relates to a hard coating film. More particularly, the present invention relates to a hard coating film with high hardness and impact resistance.

This application claims the benefit of Korean Patent Application No. 10-2012-0092532, filed on Aug. 23, 2012, and Korean Patent Application No. 10-2013-0089101, filed on Jul. 26, 2013, which are all hereby incorporated by reference in their entireties into this application.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling.

Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and is to provide a hard coating film which exhibits high hardness and impact resistance.

In accordance with an aspect thereof, the present invention provides a hard coating film, comprising:
a supporting substrate;
a first hard coating layer, formed on one side of the supporting substrate, having a first elastic modulus; and
a second hard coating layer, formed on another side of the supporting substrate, having a second elastic modulus, with a difference between the first and the second elastic moduli set to be 500 MPa or greater.

Characterized by high hardness, impact resistance, scratch resistance, and transparency, the hard coating film of the present invention can be usefully applied to touch panels of mobile terminals, smart phones or tablet PCs, and as a cover or device panel for various displays.

DESCRIPTION OF THE PREFERRED EMBODIMENTS

The present invention addresses a hard coating film, comprising:
a supporting substrate;
a first hard coating layer, formed on one side of the supporting substrate, having a first elastic modulus; and
a second hard coating layer, formed on another side of the supporting substrate, having a second elastic modulus, with a difference between the first and the second elastic moduli set to be 500 MPa or greater.

All of the terms used in the specification are taken only to illustrate embodiments, and are not intended to limit the present invention. As used herein and in the appended claims, the singular forms "a", "an", and "the" include plural reference unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

These and other non-limiting characteristics of the disclosure are more particularly disclosed below In accordance with an aspect thereof, the present invention provides a hard coating film, comprising: a supporting substrate; a first hard coating layer, formed on one side of the supporting substrate, having a first elastic modulus; and a second hard coating layer, formed on another side of the supporting substrate, having a second elastic modulus, with a difference between the first and the second elastic moduli set to be 500 MPa or greater.

So long as it is transparent, any plastic resin, whether capable of being stretched or not, may be used for the supporting substrate on opposite sides of which first and second hard coating layers are formed, respectively, without limitations imposed thereto. According to an embodiment of the present invention, the supporting substrate may include, for example, a polyester such as polyethyleneterephtalate (PET), a polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or a fluoro-polymer. The substrate may be a single layer structure, and, if necessary, may be a multilayer structure including two or more layers composed of the same or different materials, but is not particularly limited.

According to an embodiment of the present invention, the supporting substrate may be a multilayered substrate made of polyethyleneterephthalate (PET) or co-extruded polymethylmethacrylate (PMMA)/polycarbonate (PC).

Further, according to an embodiment of the present invention, the supporting substrate may include a copolymer of polymethylmethacrylate (PMMA) and polycarbonate (PC).

The supporting substrate may range in thickness from 30 to 1,200 μm, or from 50 to 800 μm, but is not limited thereto.

As described above, the hard coating film of the present invention comprises a supporting substrate with first and second hard coating layers formed on opposite sides of the supporting substrate, respectively.

In the hard coating film of the present invention, the first hard coating layer has a first elastic modulus while the second hard coating has a second elastic modulus, with a difference between the first and the second elastic moduli set to be 500 MPa or greater.

Throughout the specification, "elastic modulus" means a value measured according to ASTM D882.

That is, the hard coating film of the present invention comprises a supporting substrate sandwiched between two hard coating layers which differ in elastic modulus from each other by 500 MPa or greater. A hard coating layer with a higher elastic modulus exhibits high physical strength such as high hardness while the other coating layer with lower elastic modulus has higher impact resistance and fold endurance. Hence, the hard coating film in which two hard coating layers with different elastic moduli are deposited on opposite sides of a supporting substrate, respectively, is high in physical strength sufficient to be a substitute for glass, and is much less prone to curling or cracking, thus guaranteeing high processability.

In one embodiment, the difference between the first and the second elastic moduli is at least approximately 500 MPa, for example, ranges from approximately 500 to 3,000 MPa, or from approximately 500 to 2,500 MPa, or from approximately 500 to 2,000 MPa.

In accordance with an embodiment of the present invention, the first elastic modulus may be approximately 1,500 MPa or less, or may range from approximately 300 to 1,500 MPa, from approximately 300 to 1,200 MPa, or from approximately 300 to 1,000 MPa, while the second elastic modulus may be approximately 2,000 MPa or greater, for example, ranges from approximately 2,000 to 3,500 MPa, from approximately 2,000 to 3,000 MPa, or from approximately 2,000 to 2,800 MPa.

Given the conditions for the first and the second elastic moduli, the first hard coating layer may include a first photocurable crosslinking copolymer of a mono- to hexa-functional acrylate monomer and a first photocuarble elastic polymer.

As used herein, the term "acrylate" is intended to encompass acrylate, methancrylate, and derivatives thereof with various substituents.

As used herein, the term "photocurable elastic polymer" refers to a polymer which is of elasticity and contains a functional group that undergoes UV light-triggered crosslink polymerization.

According to an embodiment of the present invention, the photocurable elastic polymer may have an elongation of approximately 15% or more, for example, approximately 15 to 200%, approximately 20 to 200%, or approximately 20 to 150%, as measured according to ASTM D638.

The first photocurable elastic polymer is crosslink-polymerized with the mono- to hexa-functional acrylate monomer and then cured to form a first hard coating layer, conferring flexibility and impact resistance to the hard coating film due to proper elastic modulus.

According to one embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate polymer, and polyrotaxane.

Among the polymers used as the first photocurable elastic polymer, polycaprolactone is formed by the ring-opening polymerization of caprolactone, and has excellent physical properties such as flexibility, impact resistance, durability and the like.

Retaining a urethane bond therein, a urethane acrylate polymer has excellent elasticity and durability.

A polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

In one embodiment, the photocurable elastic polymer may include a rotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

No particular limitations are imposed on the macrocycle if it is large enough to surround the linear moiety. The macrocycle may include a functional group such as a hydroxide group, an amino group, a carboxyl group, a thiol group, an aldehyde group or the like, which can react with other polymers or compounds. Specific examples of the macrocycle may include α-cyclodextrin, β-cyclodextrin, γ-cyclodextrin and mixtures thereof.

Further, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may be at least one selected from the group consisting of a dinitrophenyl group, a cyclodextrin group, an amantane group, a trilyl group, a fluorescein group and a pyrene group.

As the first hard coating layer containing the first photocurable elastic polymer is formed by photocuring, it is imparted with a proper elastic modulus and allows the hard coating film to have high hardness and flexibility, particularly ensuring excellent resistance to external impact.

Examples of the mono- to hexa-functional acrylate monomers may include hydroxyethylacrylate (HEA), hydroxyethylmethacrylate (HEMA), hexanedioldicrylate (HDDA), tripropylene glycol dicrylate (TPGDA), ethylene glycol dicrylate (EGDA), trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexa-functional acrylate monomers may be used alone or in combination.

The first photocurable crosslinking copolymer may be a copolymer in which the first photocurable elastic polymer is crosslinked with a mono- to hexa-functional acrylate monomer.

Based on 100 weight parts thereof, the first photocurable crosslinking copolymer may contain the first photocurable elastic polymer in an amount of approximately 20 to 80 weight parts and the mono- to hexa-functional acrylate monomer in an amount of 80 to 20 weight parts, or the first photocurable elastic polymer in an amount of approximately 20 to 60 weight parts and the mono- to hexa-functional acrylate monomer in an amount of approximately 40 to 80 weight parts. Given the first photocurable crosslinking copolymer in which the first photocurable elastic polymer is crosslinked at such a high content, the first hard coating film can be formed with a proper elastic modulus and exhibits excellent physical properties including impact resistance.

In one embodiment of the present invention, the first hard coating layer is 50 µm or more thick, for example, ranges in thickness from approximately 50 to 300 µm, from approximately 50 to 200 µm, or from approximately 50 to 150 µm, or from approximately 70 to 150 µm.

Meanwhile, the first hard coating layers may further include typical additives such as a surfactant, a yellowing inhibitor, a leveling agent, an antifouling agent and the like in addition to the above-mentioned components. Here, the content of the additive is may be variously adjusted to the degree that the physical properties of the hard coating film are not degraded. Its content is not particularly limited, but preferably ranges from approximately 0.1 to 10 weight parts, based on 100 weight parts of the first photocurable crosslinking copolymer.

According to an embodiment of the present invention, for example, the first hard coating layer may include a surfactant as an additive. The surfactant may be a mono- or bifunctional fluorine acrylate, a fluorine surfactant, or a silicon surfactant. In this context, the surfactant may be contained in a dispersed or crosslinked form in the photocurable crosslinking copolymer. Further, a yellowing inhibitor may be used as an additive. The yellowing inhibitor may be a benzophenone compound or a benzotriazole compound.

The first hard coating layer may be formed by photocuring a hard coating composition comprising a mono- to hexa-functional acrylate monomer, a first photocurable elastic polymer, a solvent, and optionally an additive in the presence of a photoinitiator after the coating composition is applied to the substrate.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

In the composition for the first hard coating layer (hereinafter referred to as "first hard coating composition"), the solid fraction including the mono- to hexa-functional acrylate monomer, the first photocurable elastic polymer, the photoinitiator, and other additives may be used at a weight ratio of about 70:30 to about 99:1 with regard to the solvent. As such, when the hard coating composition has a high solid content, the first hard coating composition increases in viscosity, and thus can allow for thick coating, for example, form the first hard coating layer at a thickness of 50 µm or more.

So long as it meets the conditions for the second elastic modulus set forth above, the components involved in the second hard coating layer are not specifically limited. According to one embodiment, the second hard coating layer may contain a second photocurable crosslinking copolymer of a tri- to hexa-functional acrylate monomer and a second photocurable elastic polymer, and organic microparticles dispersed in the second photocurable crosslinking copolymer.

Among the tri- to hexa-functional acrylate monomers are trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexa-functional acrylate monomers may be used alone or in combination.

According to one embodiment of the present invention, the second photocurable elastic polymer may have an elongation of approximately 15% or more, for example, approximately 15 to 200%, approximately 20 to 200%, or approximately 20 to 150%, as measured according to ASTM D638.

According to another embodiment of the present invention, the photocurable elastic polymer may be a polymer or oligomer having a weight average molecular weight of about 1,000 to about 600,000 g/mol or about 10,000 to about 600,000 g/mol.

The second photocurable elastic polymer may be the same as or different from the first photocurable elastic polymer, and the description of the first hard coating layer is true of the second photocurable elastic polymer.

In one embodiment, the second photocurable elastic polymer may be at least one selected from the group consisting of polycaprolactone, a urethane acrylate polymer, and polyrotaxane. When the second photocurable elastic polymer is photocured, the resulting second hard coating layer is imparted with high resistance against external impact.

The second photocurable crosslinking copolymer contained in the second hard coating layer may be a copolymer in which a tri- to hexa-functional acrylate monomer is crosslinked with the second photocurable elastic polymer.

Based on 100 weight parts thereof, the second photocurable crosslinking copolymer may contain the second photocurable elastic polymer in an amount of 5 to 20 weight parts and the tri- to hexafunctional acrylate monomer in an amount of 80 to 95 weight parts. When the tri- to hexafunctional acrylate monomer and the second photocurable elastic polymer are crosslink polymerized with each other at the weight ratio, the second hard coating layer has an elastic modulus in a suitable range and exhibits high hardness and impact resistance without deteriorating other properties including curling or light resistance.

According to one embodiment, the second hard coating layer may comprise inorganic microparticles dispersed in the second photocurable crosslinking copolymer.

According to another embodiment of the present invention, the inorganic particles may be inorganic nanoparticles having a particle size of about 100 nm or less, about 10 to about 100 nm or about 10 to about 50 nm. For example, silica particles, aluminum oxide particles, titanium oxide particles or zinc oxide particles may be used as the inorganic particles.

The inorganic particles in the hard coating layer make additional contribution to improving the hardness of the hard coating film.

Based on 100 weight parts thereof, the second hard coating layer may contain the second photocurable crosslinking copolymer in an amount of approximately 40 to 90 weight parts and the inorganic microparticles in an amount of 10 to 60 weight parts, or the second photocurable crosslinking copolymer in an amount of approximately 50 to 80 weight parts and the inorganic microparticles in an amount of approximately 20 to 50 weight parts. Given the amounts of the photocurable copolymer and the inorganic microparticles within the ranges set forth above, the hard coating film can be formed with excellent physical properties.

After being completely cured, the second hard coating layer may have a thickness of approximately 50 to 300 μm, approximately 50 to 200 μm, approximately 50 to 150 μm, or approximately 70 to 150 μm.

Meanwhile, the second hard coating layer may further include typical additives such as a surfactant, a yellowing inhibitor, a leveling agent, an antifouling agent and the like in addition to inorganic microparticles. Here, the content of the additive is may be variously adjusted to the degree that the physical properties of the hard coating film are not degraded. Its content is not particularly limited, but preferably ranges from approximately 0.1 to 10 weight parts, based on 100 weight parts of the second photocurable crosslinking copolymer.

According to an embodiment of the present invention, for example, the second hard coating layer may include a surfactant as an additive. The surfactant may be a mono- or bi-functional fluorine acrylate, a fluorine surfactant, or a silicon surfactant. In this context, the surfactant may be contained in a dispersed or crosslinked form in the second photocurable crosslinking copolymer. Further, the second hard coating layer may include a yellowing inhibitor as an additive. The yellowing inhibitor may be a benzophenone compound or a benzotriazole compound.

The second hard coating layer may be formed by photocuring a second hard coating composition comprising a tri- to hexa-functional acrylate monomer, a second photocurable elastic polymer, inorganic microparticles, optionally an additive and an organic solvent in the presence of a photoinitiator after the second composition is applied to the other side of the substrate.

The photoinitiator may be the same as or different from that used in the first hard coating composition. For details of the photoinitiator, reference may be made to the description of the first hard coating composition. The photoinitiators may be used alone or in combination.

Also, the organic solvent may be the same as or different from that used for the first hard coating composition. For details of the solvent, reference may be made to the description of the first coating composition.

In accordance with one embodiment, the hard coating film of the present invention may further comprise at least one layer, or film, such as a plastic resin film, an adhesive film, an releasable film, an electrically conductive film, an electrically conductive layer, a curable resin layer, a non-conductive film, a metal mesh layer, or patterned metal layer on either the first or the second hard coating layer. In addition, the layer, or film may take any form such as a monolayer, a bilayer or a lamination. The layer, or film may be constructed on the hard coating layer by, but not limited to, laminating a freestanding film with the aid of an adhesive or an adhesive film, or by coating, deposition, or sputtering.

Particularly, the layer, or film may be brought into direct contact with the first hard coating layer to allow the hard coating film to improve in resistance against external impact and abrasion.

To increase adhesiveness with the layer, or film, the first hard coating layer may be surface treated with plasma, corona discharge, or an alkaline solution of sodium hydroxide or potassium hydroxide.

The first and the second hard coating compositions may be applied onto the front and back sides of the supporting substrate, respectively, in a sequential or simultaneous manner before photocuring.

The hard coating film according to the present invention may be prepared in the following manner.

First, the first hard coating composition containing the above-mentioned components is applied to one side of the supporting substrate and photocured to form a first hard coating layer.

Any method that is available in the art would be used in the application of the first hard coating composition without particular limitations. For example, the hard coating composition may be applied by bar coating, knife coating, roll coating, blade coating, die coating, micro-gravure coating, comma coating, slot die coating, lip coating, solution casting or the like.

Next, the applied first hard coating composition is photocured under UV light to form a first hard coating layer.

UV radiation may be emitted at a dose of approximately 20 to 600 mJ/cm$^2$, or approximately 50 to 500 mJ/cm$^2$. Any light source that is used in the art would be applied to the present invention without particular limitation. For example, a high-pressure mercury lamp, a metal halide lamp, a black light fluorescent lamp or the like may be used. The photocuring may be carried out by irradiating UV light at the dose for about 30 sec to about 15 min, or for about 1 to about 10 min.

After being completely cured, the first hard coating layer may have a thickness of approximately 50 to 300 μm, approximately 50 to 200 μm, approximately 50 to 150 μm, or approximately 70 to 150 μm.

The presence of the first hard coating layer ensures the high hardness of the hard coating film without a decrease in curling property.

Subsequently, the second hard coating composition comprising the above-mentioned components is applied to the other side, e.g., back side of the supporting substrate. Then, the second hard coating composition is cured to form a second hard coating layer after exposure to UV light. During the photocuring of the second hard coating composition, UV light is irradiated to a side opposite to that coated with the first hard coating composition. Thus, the curl which may be generated by setting shrinkage in the former photocuring step is counterbalanced to afford a flat hard coating film. No additional flattering processes are thus needed.

UV radiation may be emitted at a dose of approximately 20 to 600 mJ/cm$^2$, or approximately 50 to 500 mJ/cm$^2$. Any light source that is used in the art would be applied to the present invention without particular limitation. For example, a high-pressure mercury lamp, a metal halide lamp, a black light fluorescent lamp or the like may be used. The photocuring may be carried out by irradiating UV light at the dose for about 30 sec to about 15 min, or for about 1 to about 10 min.

After being completely cured, the second hard coating layer may have a thickness of approximately 50 to 300 μm, approximately 50 to 200 μm, approximately 50 to 150 μm, or approximately 70 to 150 μm.

In the preparation method of the hard coating film according to one embodiment, coating and photocuring steps of the first hard coating composition may be performed in advance of or following those of the second hard coating composition.

For use as a cover for mobile terminals or tablet PCs, the hard coating film must have hardness or impact resistance elevated sufficiently to be a substitute for glass. Even when formed at a high thickness on the substrate, the hard coating layer of the present invention is less prone to curling or cracking, and imparts the hard coating film with high transparency and impact resistance.

The hard coating film according to the present invention is superior in hardness, scratch resistance, transparency, durability, light resistance, and light transmittance.

The impact resistance of the hard coating film is high enough to be a substitute for glass. For example, the hard coating film of the present invention may not crack even after a steel bead weighing 22 g is freely dropped ten times from a height of 50 cm thereto.

In addition, the second hard coating layer in the hard coating film of the present invention may have a pencil hardness of 7H or more, 8H or more, or 9H or more at a load of 1 kg.

Further, after the second hard coating layer in the hard coating film of the present invention is tested by double rubbing 400 times with a steel wool #0000 under a load of 500 g on a friction tester, only two or less scratch may appear.

The hard coating film of the present invention may have a light transmittance of 91.0% or more, or 92.0% or more, and a haze of 1.0% or less, 0.5% or less, or 0.4% or less.

Further, the hard coating film of the present invention may have an initial color b value of 1.0 or less. After the hard coating film is exposed to UV-B under an ultraviolet lamp for 72 hrs or more, it may have a color b* value which differs from the pre-exposed color b* value by 0.5 or less, or by 0.4 or less.

When the hard coating film of the present invention is disposed on a plane after exposure to a temperature of 50° C. or higher at a humidity of 80% or higher for 70 hrs, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50° C. to 90° C. at a humidity of 80% to 90% for 70 to 100 hrs, each edge or side of the hard coating film is spaced apart from the plane by about 1.0 mm or less, about 0.6 mm or less, or about 0.3 mm or less, maximally.

Exhibiting excellent physical properties including hardness, impact resistance, scratch resistance, transparency, durability, light resistance, and light transmittance, the hard coating film of the present invention has useful applications in various fields. For example, the hard coating film of the present invention can be used in the touch panels of mobile terminals, smart phones or tablet PCs, and as covers or device panels for various displays A better understanding of the present invention may be obtained through the following examples which are set forth to illustrate, but are not to be construed as limiting the present invention.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain polyrotaxane in which polylactone with an acrylate moiety conjugated to the end thereof acted as the macrocycle while cyclodextrin was positioned as the stopper.

The polyrotaxane had a weight average molecular weight of 600,000 g/mol, and was found to have an elongation of 20%, as measured according to ASTM D638.

Example 1

A first hard coating composition was prepared by mixing 6 g of trimethylolpropane triacrylate (TMPTA), 4 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied to a PET substrate 188 μm thick with a size of 15 cm×20 cm, and then subjected to first photocuring by exposure to 280-350 nm UV light from a black light fluorescence lamp.

Subsequently, the first hard coating composition was applied to the back side of the substrate, and then exposed to 280-350 nm UV light from a black light fluorescence lamp to give a hard coating film. Each of the first and the second hard coating layers formed on both sides of the substrate was 100 μm thick.

Example 2

A hard coating film was prepared in the same manner as in Example 1, with the exception that 4 g of a urethane acrylate polymer (brand name: UA200PA, Shinnakamura Chemicals Corp., weight average molecular weight: 2,600 g/mol, elongation measured according to ASTM D638: 170%), and 1 g of a urethane acrylate polymer (brand name: UA200PA) were used, instead of 4 g and 1 g of the polyrotaxane of Preparation Example 1 in the first and the second hard coating compositions, respectively.

Example 3

A hard coating film was prepared in the same manner as in Example 1, with the exception that 4 g of a urethane acrylate polymer (brand name: UA340PA, Shinnakamura Chemicals Corp., weight average molecular weight: 13,000 g/mol, elongation measured according to ASTM D638: 150%), and 1 g of a urethane acrylate polymer (brand name: UA340PA) were used, instead of 4 g and 1 g of the polyrotaxane of Preparation Example 1 in the first and the second hard coating compositions, respectively.

Example 4

A hard coating film was prepared in the same manner as in Example 1, with the exception that 1 g of a urethane acrylate polymer (brand name: UA200PA) was used, instead of 1 g of the polyrotaxane of Preparation Example 1 in the second hard coating composition.

Example 5

A hard coating film was prepared in the same manner as in Example 1, with the exception that 1 g of a urethane acrylate polymer (brand name: UA340PA) was used, instead of 1 g of the polyrotaxane of Preparation Example 1 in the second hard coating composition.

Example 6

A hard coating film was prepared in the same manner as in Example 1, with the exception that each of the first and the second hard coating layers formed on both sides of the substrate was 150 μm after completion of the photocuring.

Example 7

A first hard coating composition was prepared by mixing 5 g of trimethylolpropane triacrylate (TMPTA), 5 g of the polyrotaxane prepared in Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The first hard coating composition was applied to a PET substrate 100 μm thick with a size of 15 cm×20 cm, and then subjected to first photocuring by exposure to 280-350 nm UV light from a black light fluorescence lamp. After completion of the photocuring, the first hard coating layer thus formed was 125 μm thick.

The second hard coating composition was applied to the first hard coating layer, and subjected to second photocuring by exposure to 280-350 nm UV light from a black light fluorescence lamp to give a hard coating film. The second hard coating layer laminated on the first hard coating was 100 μm thick.

Comparative Example 1

A first hard coating composition was prepared by mixing 10 g of trimethylolpropane triacrylate (TMPTA), 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methylethylketone.

A second hard coating composition was prepared by mixing 10 g of a silica-dipentaerythritolhexacrylate (DPHA) composite in which silica nanoparticles with a particle size of 20~30 nm were dispersed by 40 wt % (silica 4 g, DPHA 6 g), 0.1 g of a benzotriazole-based yellowing inhibitor (brand name: Tinuvin 400), and 0.05 g of a fluorine surfactant (brand name: FC4430).

The second hard coating composition was applied to a PET substrate 188 μm thick with a size of 15 cm×20 cm, and then subjected to first photocuring by exposure to 280-350 nm UV light from a black light fluorescence lamp.

Subsequently, the first hard coating composition was applied to the back side of the substrate, and then exposed to 280-350 nm UV light from a black light fluorescence lamp to give a hard coating film. Each of the first and the second hard coating layers formed on both sides of the substrate was 100 μm thick.

Elastic moduli of the hard coating films prepared in Examples 1 to 7 and Comparative Example 1 are summarized in Table 1, below.

TABLE 1

| | Elastic Modulus of $1^{st}$ Hard Coating Layer (unit: MPa) | Elastic Modulus of $2^{nd}$ Hard Coating Layer (uni: MPa) | Difference (unit: MPa) |
|---|---|---|---|
| Ex. 1 | 600 | 2500 | 1900 |
| Ex. 2 | 550 | 2300 | 1750 |
| Ex. 3 | 400 | 2350 | 1950 |
| Ex. 4 | 600 | 2300 | 1700 |
| Ex. 5 | 600 | 2350 | 1750 |
| Ex. 6 | 600 | 2500 | 1900 |
| Ex. 7 | 350 | 2500 | 2150 |
| C. Ex. 1 | 3100 | 3300 | 200 |

Test Examples

Measuring Method

1) Pencil Hardness

Pencil hardness was evaluated according to the Japanese Standard JIS K5400. In this regard, a pencil hardness meter was reciprocated three times on the second hard coating layer of each of the hard coating films under a load of 1.0 kg to determine the hardness at which no scratches appeared.

2) Scratch Resistance

After being loaded to a friction tester, a steel wool (#0000) was reciprocated 400 times on the second hard coating layer of each of the hard coating films under a load of 0.5 kg, and scratches thus formed were counted. Evaluation was made of the scratch resistance of the films by marking 0 for two or less scratches, for two to less than five scratches, and x for five or more scratches.)

3) Light Resistance

Differences in color b* value of the hard coating films were measured before and after exposure to UVB from UV lamp for 72 hrs.

4) Transmittance and Haze

The hard coating films were measured for transmittance and haze using a spectrophotometer (brand name: CHO-400))

5) Curl Property at High Humidity and Temperature

After a hard coating film piece with dimensions of 10 cm×10 cm was stored for 72 hrs in a chamber maintained at a temperature of 85° C. and a humidity of 85%, it was placed on a flat plane. A maximal distance at which each edge of the piece was apart from the plane was measured.

6) Cylindrical Bending Test

Each of the hard coating films was wound on a cylindrical mandrel having a diameter of 1 cm so that the first hard coating layer is toward outside. When the hard coating film was not cracked, it was evaluated as OK. If the hard coating film was cracked, it was evaluated as X.

7) Impact Resistance

The impact resistance of the second hard coating layer of each of the hard coating films was evaluated by determining whether or not each of the hard coating films was cracked when a 22 g steel ball was freely dropped 10 times thereon from a height of 50 cm. Each of the hard coating films was evaluated as OK when it was not cracked, and as X when cracked.

The results of the physical properties measured in each of the hard coating films are summarized in Table 2 below.

TABLE 2

|  | Ex. 1 | Ex. 2 | Ex. 3 | Ex. 4 | Ex. 5 | Ex. 6 | Ex. 7 | C. Ex. 1 |
| --- | --- | --- | --- | --- | --- | --- | --- | --- |
| Pencil hardness | 8H | 9H | 8H | 9H | 8H | 9H | 9H | 9H |
| Scratch resistance | ○ | ○ | ○ | ○ | ○ | ○ | ○ | ○ |
| Light resistance | 0.20 | 0.18 | 0.25 | 0.20 | 0.23 | 0.26 | 0.21 | 0.42 |
| Transmittance | 92.0 | 92.2 | 92.0 | 92.5 | 92.2 | 92.0 | 92.1 | 92.1 |
| Haze | 0.3 | 0.3 | 0.2 | 0.2 | 0.4 | 0.4 | 0.3 | 0.2 |
| Bending test | OK | OK | OK | OK | OK | OK | OK | X |
| Curl property at high humidity & temperature | 0.3 mm | 0.2 mm | 0.3 mm | 0.2 mm | 0.4 mm | 0.4 mm | 0.2 mm | 0.4 mm |
| Impact resistance | OK | OK | OK | OK | OK | OK | OK | X |

As shown in Table 2 above, it can be ascertained that all of the hard coating films in which the second hard coating layer is greater in elastic modulus than the first hard coating layer by 500 MPa or larger exhibit good physical properties. In contrast, the film, prepared in Comparative Example 1, in which the first and the second hard coating layers differ in elastic modulus by 500 MPa or less was found to be insufficient in impact resistance.

What is claimed is:

1. A hard coating film, comprising:
  a supporting substrate;
  a first hard coating layer, formed on one side of the supporting substrate, having a first elastic modulus; and
  a second hard coating layer, formed on another side of the supporting substrate, having a second elastic modulus, with a difference between the first and the second elastic moduli set to be 500 MPa or greater,
  wherein the hard coating film exhibits a pencil hardness of 7H or more at a load of 1 kg.

2. The hard coating film of claim 1, wherein the difference between the first and the second elastic moduli set to range from 500 to 3,000 MPa.

3. The hard coating film of claim 1, wherein the first elastic modulus is 1,500 MPa or less and the second elastic modulus is 2,000 MPa or more.

4. The hard coating film of claim 1, wherein the first hard coating layer comprises a first photocurable crosslinking copolymer of a first photocurable elastic polymer and a mono to hexa-functional acrylate monomer, and the second coating layer comprises a second photocurable crosslink copolymer of a second photocurable elastic polymer and a tri- to hexa-functional acrylate monomer, and inorganic microparticles dispersed in the second photocurable crosslinking copolymer.

5. The hard coating film of claim 4, wherein the first and the second photocurable elastic polymers are the same or different, and independently have an elongation of 15 to 200%, as measured according to ASTM 0638.

6. The hard coating film of claim 4, wherein the first and the second photocurable elastic polymers are the same o different, and independently comprise at least one selected from the group consisting of a polycaprolactone, a urethane acrylate polymer, and a polyrotaxane.

7. The hard coating film of claim 6, wherein the polyrotaxane comprises a cyclic moiety (macrocycle) in which lactone compounds with a (meth) acrylate moiety conjugated to the end thereof are bonded to each other; a thread moiety held within the macrocycle; and stoppers provided at both ends of the thread moiety so as to prevent dissociation of the macrocycle.

8. The hard coating film of claim 4, wherein the first hard coating layer contains the first photocurable elastic polymer in an amount of 20 to 80 weight parts and the mono- to hexa-functional acrylate monomer in an amount of 80 to 20 weight parts, based on 100 weight parts of the first hard coating layer.

9. The hard coating film of claim 4, wherein the second hard coating layer contains 5 to 20 weight parts of the second photocurable elastic polymer polymerized with 80 to 95 weight parts of the tri- to hexa-functional acrylate monomer, based on 100 weight parts of the second photocurable crosslinking copolymer.

10. The hard coating film of claim 4, wherein the second hard coating layer contains the second photocurable crosslinking copolymer in an amount of 40 to 90 weight parts, and the inorganic microparticles in an amount of 10 to 60 weight parts, based on 100 weight parts of the second hard coating layer.

11. The hard coating film of claim 4, wherein the mono- to hexa-functional acrylate monomer is selected from the group consisting of hydroxyethylacrylate (REA), hydroxyethylmethacrylate (HEMA), hexandiol dicrylate (HDDA), tripropylene glycol dicrylate (TPGDA), ethylene glycol dicrylate (EGDA), trimethylolpropane triacrylate (TMPTA), trimethylolpropane ethoxytriacrylate (TMPEOTA), glycerinpropoxylated triacrylate (GPTA), pentaerythritol tetraacrylate (PETA), dipentaerythritol hexaacrylate (DPHA), and a combination thereof.

12. The hard coating film of claim 4, wherein the tri- to hexa-functional acrylate monomer is selected from the group consisting of trimethylolpropane triacrylate (TMPTA), trimethylolpropane ethoxytriacrylate (TMPEOTA), glycerin propoxylated triacrylate (GPTA), pentaerythritol tetraacrylate (PETA), dipentaerythritol hexaacrylate (DPHA), and a combination thereof.

13. The hard coating film of claim 1, wherein the substrate includes at least one selected from polyethyleneterephtalate (PET), ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), and a fluoro-polymer.

14. The hard coating film of claim 1, wherein the first and the second hard coating layers independently range in thickness from 50 to 300 μm.

15. The hard coating film of claim 1, wherein the hard coating film does not crack when a 22 g steel ball is freely dropped 10 times thereon from a height of 50 cm.

16. The hard coating film of claim 1, wherein two or less scratches are formed when the surface of the hard coating layer is rubbed by reciprocating a steel wool #0000 thereon 400 times under a load of 500 g.

17. The hard coating film of claim 1, having a light transmittance of 91% or more, a haze of 0.4 or less, and a color b* value of 1.0 or less.

18. The hard coating film of claim 1, wherein the hard coating film has a color b* value after exposure to UV B for 72 hrs which differs from a pre-exposed, color b* value by 0.5 or less.

19. The hard coating film of claim 1, wherein when the hard coating film is disposed on a plane after exposure to a temperature of 50° C. or higher at a humidity of 80% or higher for 70 hrs or longer, each edge or side of the hard coating film is spaced apart from the plane by 1.0 mm or less, maximally.

20. The hard coating film of claim 1, further comprising on the first or the second hard coating layer at least one layer selected from the group consisting of a plastic resin film, an adhesive film, an releasable film, an electrically conductive film, an electrically conductive layer, a curable resin layer, a non-conductive film, a metal mesh layer, and a patterned metal layer.

* * * * *